US011674805B2

(12) United States Patent
Jha et al.

(10) Patent No.: US 11,674,805 B2
(45) Date of Patent: Jun. 13, 2023

(54) SYSTEM AND METHOD FOR VOYAGE CONSUMPTION OPTIMIZATION

(71) Applicant: Alpha Ori Technologies Pte. Ltd, Singapore (SG)

(72) Inventors: Somesh Jha, San Diego, CA (US); Piyush Raj, Singapore (SG)

(73) Assignee: Alpha Ori Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/776,261

(22) Filed: Jan. 29, 2020

(65) Prior Publication Data

US 2020/0240787 A1 Jul. 30, 2020

Related U.S. Application Data

(60) Provisional application No. 62/798,338, filed on Jan. 29, 2019.

(51) Int. Cl.
| | |
|---|---|
| *G01C 21/12* | (2006.01) |
| *G06Q 10/083* | (2023.01) |
| *G01S 19/52* | (2010.01) |
| *G01C 21/20* | (2006.01) |
| *G01S 19/42* | (2010.01) |
| *B63B 49/00* | (2006.01) |

(52) U.S. Cl.
CPC ............. *G01C 21/12* (2013.01); *B63B 49/00* (2013.01); *G01C 21/203* (2013.01); *G01S 19/42* (2013.01); *G01S 19/52* (2013.01); *G06Q 10/083* (2013.01)

(58) Field of Classification Search
CPC ............................... G01C 21/12; B63B 49/00
See application file for complete search history.

(56) References Cited

U.S. PATENT DOCUMENTS

| | | | |
|---|---|---|---|
| 10,054,939 B1* | 8/2018 | Applewhite | .............. B64F 1/06 |
| 2009/0018774 A1* | 1/2009 | Winkler | .............. G01C 13/002 |
| | | | 702/2 |
| 2010/0168942 A1* | 7/2010 | Noffsinger | ........... G05D 1/0206 |
| | | | 715/764 |
| 2010/0185471 A1* | 7/2010 | Chen | ..................... G06Q 10/06 |
| | | | 705/7.38 |
| 2014/0278064 A1* | 9/2014 | Lee | ......................... G01C 21/34 |
| | | | 701/428 |
| 2020/0225385 A1* | 7/2020 | O'Donncha | ............ H04L 67/12 |

FOREIGN PATENT DOCUMENTS

EP 2498056 B1 8/2015

OTHER PUBLICATIONS

The International Search Report and Written Opinion, fsyrf Jul. 23, 2020, in the related PCT Appl. No. PCT/IB2020/000050.

* cited by examiner

*Primary Examiner* — Jess Whittington

(57) ABSTRACT

A system and method for predicting, forecasting and suggesting voyage plans for a vessel by considering design parameters, weather in sailing routes and a user's preference for best weather or best economy or fastest way to reach the destination. Voyage plans are optimized using the above parameters, and directions are continuously provided in the form of heading and speeds to be maintained by the vessel during the course of the voyage.

16 Claims, 6 Drawing Sheets

SYSTEM AND METHOD FOR VOYAGE CONSUMPTION OPTIMIZATION

RELATED APPLICATIONS

This application claims priority under 35 U.S.C. § 119(e) to U.S. Provisional Patent Application No. 62/798,338, entitled "Voyage Consumption Optimization (VCOPT)" and filed on Jan. 29, 2019. The provisional patent application is hereby incorporated by reference in its entirety herein.

FIELD OF THE INVENTION

This disclosure relates generally to systems and methods for selecting and preparing voyage plans for a vessel, and more particularly, to systems and methods for selecting and preparing voyage plans that manage vessel routing and speed to minimize fuel consumption.

BACKGROUND

Merchant vessels are often contracted often for conducting a voyage within a given time interval (often ending in a "laycan" period during which the vessel is expected to be in port for loading/discharging). If the vessel is in port and the charterer fails to load or discharge during this period, the vessel owner may be entitled to compensation by the charterer ("demurrage"). If the charter completes the loading/discharging in a shorter period of time, the charterer may be entitled to compensation by the owner ("despatch"). Because going at a faster speed generally results in higher fuel consumption, owners would prefer for ships to reach port "just-in-time" to avoid fuel consumption losses often categorized as "rush to wait" in the shipping world. However, going at a slow speed for much of the voyage without having considering weather could require the ship suboptimally to maintain this speed even in very bad weather in order to arrive during the desired time period.

References pertinent to the analysis of vessel fuel consumption include:

Schneekluth, H. and Bertram, V. (1998), *Ship Design for Efficiency and Economy*, Second edition, Butterworth-Heinemann, ISBN 0 7506 4133 9.

Breslin, S. and Andersen, P. (1994), *Hydrodynamics of Ship Propellers*, Cambridge: Cambridge University Press.

International Towing tank Conference (ITTC) recommended methods, ittc.info.

Blendermann, W. (1986), *Die Windkräfte am Schiff*, Institute of Naval Architecture, University of Hamburg.

Dr. C. B. Barrass (2004), Ship Design and Performance for Masters and Mates, Elsevier Butterworth-Heinemann.

Regulation (eu) 2015/757 of the European Parliament and of the Council of 29 Apr. 2015 on the monitoring, reporting and verification of carbon dioxide emissions from maritime transport, and amending Directive 2009/16/EC.

It would be beneficial to monitor forecasted weather along a shipping route for the entire duration of a voyage in a granular way, and modulate the speed of the vessel to optimize fuel consumption over the entire voyage. In order to accomplish this, it would be important that the ship's hull profile is known accurately, and weather parameters are made available accurately and in a timely manner.

SUMMARY

By way of example, aspects of the present disclosure are directed to disclose a novel system and method for predicting, forecasting and suggesting voyage plans for a vessel.

In accordance with aspects of the present disclosure, a computer-based system and method are disclosed for selecting routes for a voyage plan for a vessel, by performing the steps of: a. identifying each of a start point, a destination and an acceptable destination arrival period, b. querying a database to determine historically-used routes as candidates for selection, c. acquiring vessel-specific design data for determining fuel oil consumption as a function of vessel conditions, vessel speed and weather conditions, d. obtaining weather data that forecasts position and timing of adverse weather conditions along historically-used routes, e. calculating ship headings and speeds along the candidate routes subject to the acceptable destination arrival period, wherein the speeds are calculated to minimize fuel oil consumption subject to speed increases or decreases necessary to avoid routing through adverse weather conditions, and f. identifying an optimal one of the candidate routes as the selected route.

In accordance with an additional aspect of the disclosure, the steps are performed repeatedly.

This SUMMARY is provided to briefly identify some aspects of the present disclosure that are further described below in the DESCRIPTION. This SUMMARY is not intended to identify key or essential features of the present disclosure nor is it intended to limit the scope of any claims.

BRIEF DESCRIPTION OF THE DRAWING

A more complete understanding of the present disclosure may be realized by reference to the accompanying drawing in which.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

Figure 1:
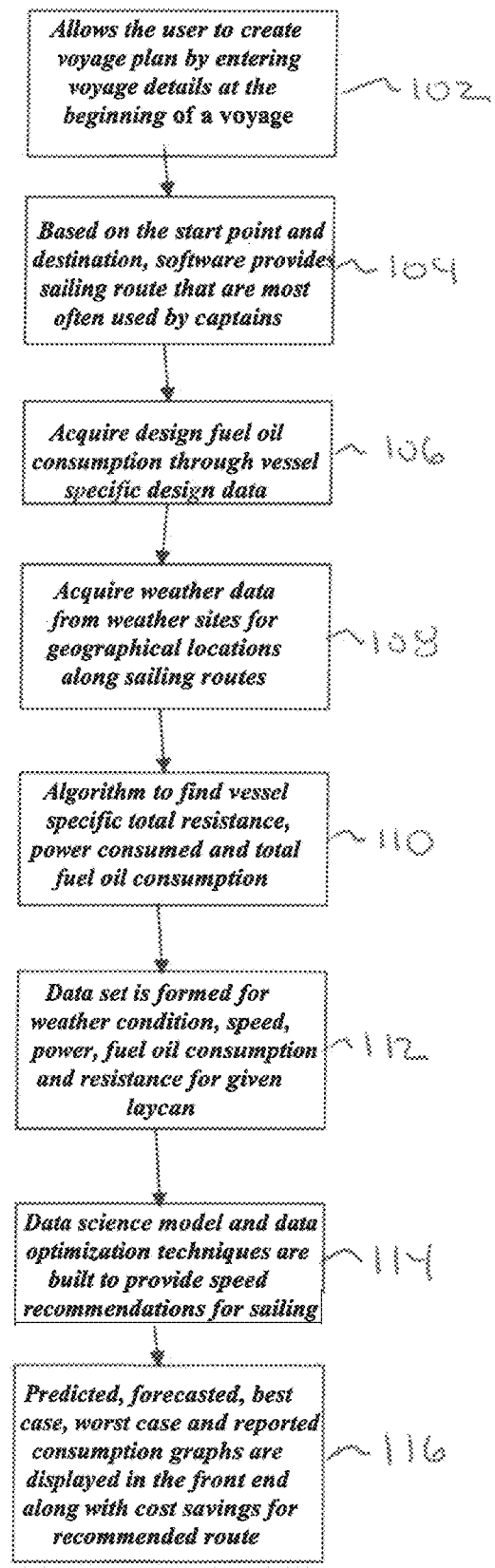
FIG. 1 provides a flow diagram illustrating a method for selecting a voyage plan in accordance with aspects of the present disclosure.
Figure 2:
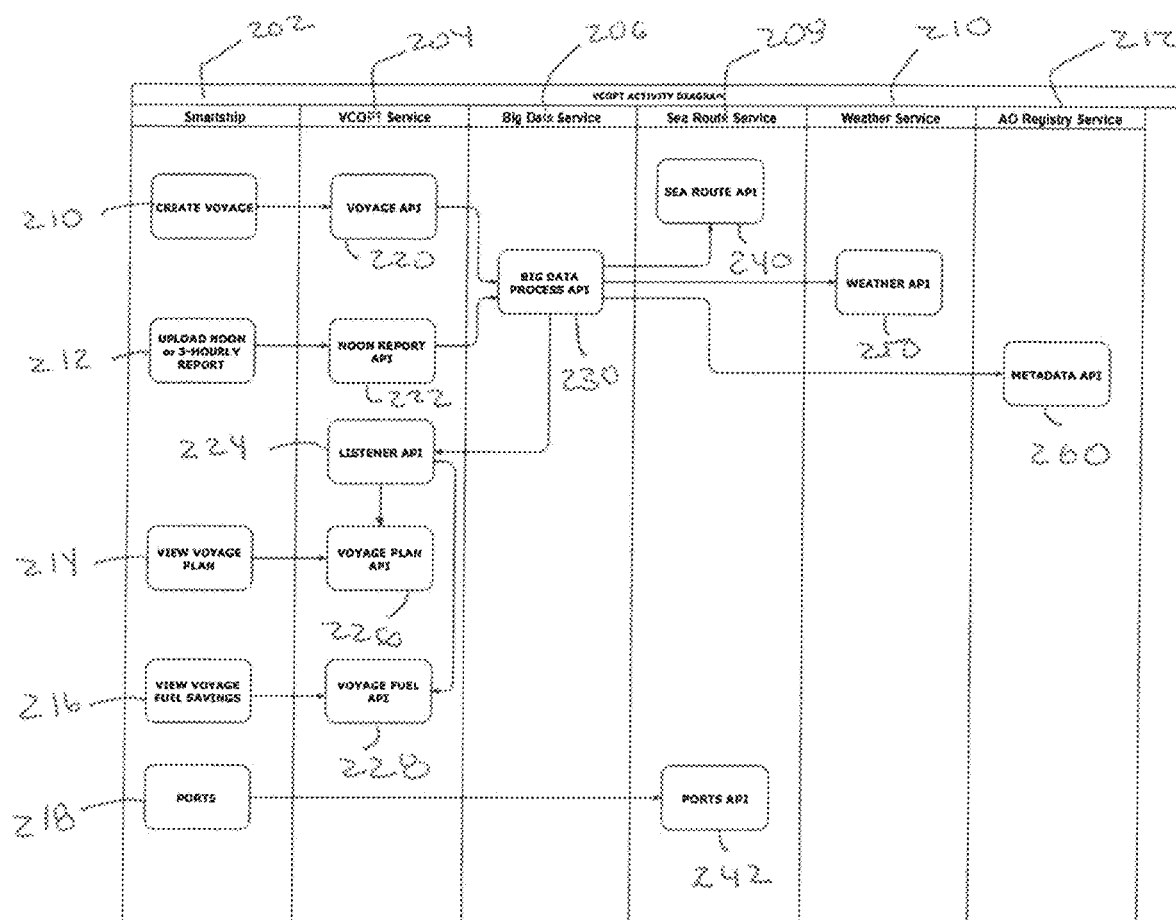
FIG. 2 presents a swim lane diagram illustrating elements of a system for performing the method of FIG. 1 in accordance with aspects of the present disclosure.

Aspects of the present disclosure are directed to a novel system and method for predicting, forecasting and suggesting voyage plans for a vessel. With reference to FIGS. 1 and 2, an exemplary system and method are depicted in accordance with the present disclosure. At steps 102 of FIG. 1 and 210 of FIG. 2, a user begins to create a voyage plan by entering voyage details (for example, including a starting point and destination). This may be facilitated, for example, using a SMARTSHIP service 202 as is available from Alpha Ori Technologies Pte. Ltd., Singapore. At step 104 of FIG. 1, a Voyage Consumption Optimization (VCOPT) element 204 invokes a voyage API to query a BIGDATA service 206 to invoke a Big Data Process API 230 to invoke a Sea Route API 240 to query a Sea Route Service 208 (for example, NETPAS available at https://www.netpas.net) to determine applicable routes often used by merchant captains.

VCOPT service 204 is a next generation fuel consumption optimization application. It may, for example, be implemented using software as a service (SaaS) model on a platform such as AMAZON WEB SERVICE (AWS) available from AMAZON of Seattle, Wash. VCOPT service 204 utilizes a combination of algorithms to simultaneously consider contributing parameters and optimizes the total fuel oil consumption for vessel's voyages. It also uses various methods to provide voyage route recommendations based on the collected data. This application provides the fuel consumptions for all the past and current voyages and forecasts for the future voyages of vessel. This provides the predicted and reported routes for a voyage. This provides a recommended route for the vessel in order to make the maximum fuel savings, and other related data such as fuel used, distance travelled, carbon emission variance and daily variance. Importantly, it functions to recommend multiple options to reach the destination by proposing speeds to delay or skip a bad weather situation. It also recommends voyage plans to reach the destination at the shortest possible time (fastest).

Vessel-specific suggestions may be provided, forbased on design data of ship, fuel estimation figures with currency value, speed to sail at different geographical locations based on weather. Best case, worst case, hybrid, best economy, best weather and forecast curves may be produced and shown continuously. VCOPT service 204 considers the historically most sailed routes for a vessel's voyage, and predicts or forecasts the fuel oil consumption. It considers live weather data from leading weather sites and calculates vessel specific weather resistance for voyage plans.

With reference to steps 106 and 108 of FIG. 1, VCOPT service 204 may retrieve vessel-specific design data and weather data from BIGDATA service 206, which may have been obtained, for example from AO registry service 212 (see, e.g., https://demoregistry.alphaorimarine.com) and third-party weather services 210 (for example, PLANETOS available at https://planetos.com/), respectively, via metadata API 260 and weather API 250. Historical and forecast weather data may preferably include, for a given latitude & longitude, wave height, wind speed, wind direction, ocean current speed, ocean current direction and Beaufort wind force scale.

At steps 110 and 112 of FIG. 1, VCOPT service 204 analyzes the data to determine a vessel-specific total resistance, power consumption and total fuel oil consumption for several feasible routes subject to the desired in-port interval (laycan). At step 114, BIGDATA service 206 applies optimization analysis to provide speed recommendations along segments of each route.

During the voyage, each vessel prepares daily voyage and/or noontime reports that are uploaded to the SMARTSHIP service 202 at step 212 of FIG. 2, and to BIGDATA service 206 via noon report API 222 by VCOPT service 204. On receipt of this data, BIGDATA service API collects 230information from SeaRoute services and weather APIs and completes the optimization. Listener APIs 224in VCOPT service 204 collect and prepare this data and prepare via voyage plan API 226 and voyage fuel API 228 to be rendered by SMARTSHIP service 202 as voyage plan 214 and fuel consumption details 216, under various display options. Ports API 242 obtains port names from third party sources, and help user choose correct ports 218.

As described above, VCOPT service 204 solves the fundamental optimization problem for vessel's consumption by simultaneously optimizing key variables, including for example, hull profile impact, weather and speed variation of ship over the entire length of voyage. This approach is further illustrated by FIGS. 3(a), 3(b).

A key advantage of the disclosed method is that it provides a continuously optimized consumption for the entire voyage, which provides a global optima when compared to other approaches which consider only some of the factors and provide a partially optimized consumption value. Notably, VCOPT service 204 operates to continuously guide the vessel towards the optimal route, if the vessel deviates from the optimal path for some reason.

Figure 3A:
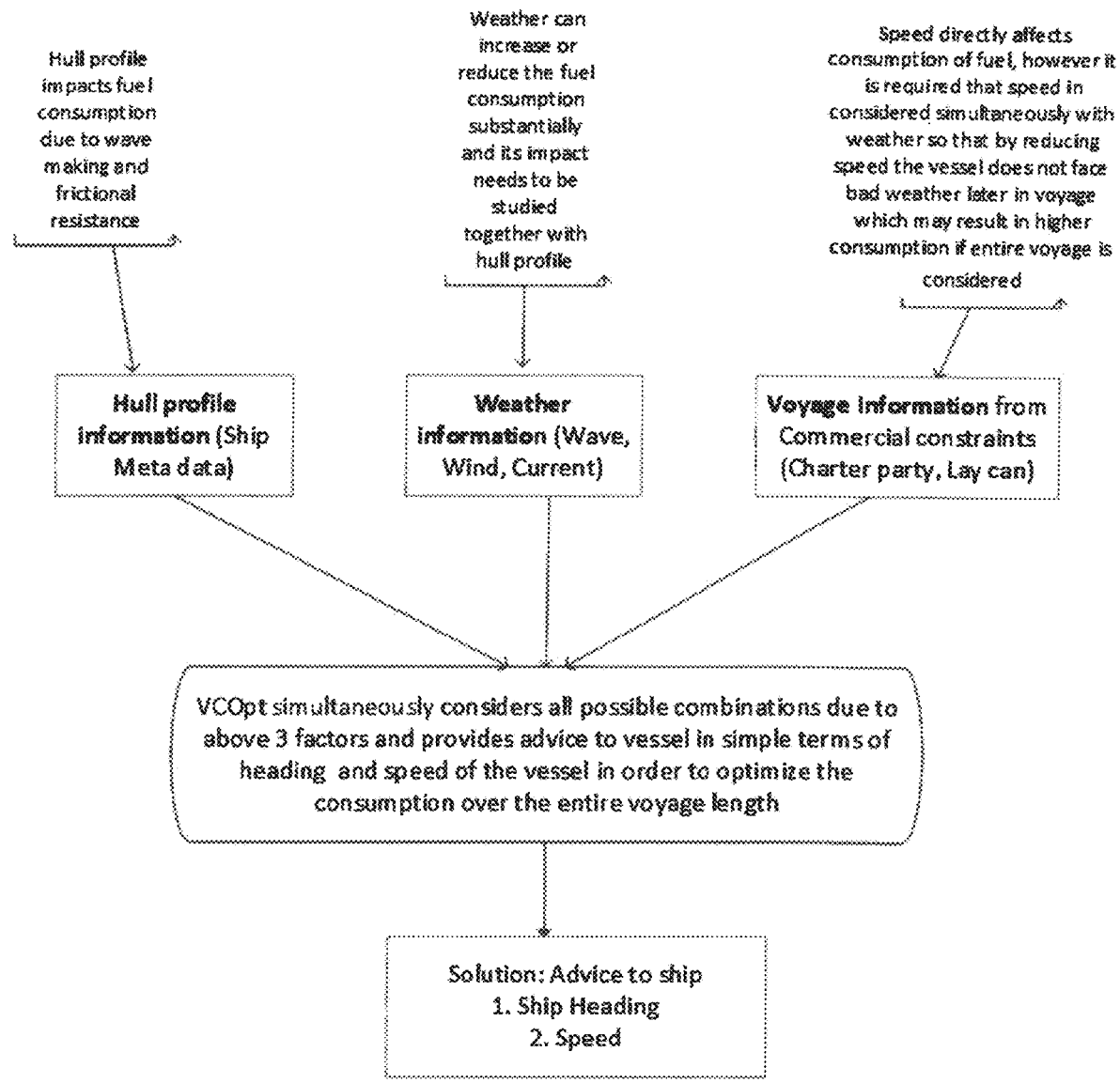
FIG. 3(a) presents a flow diagram further illustrating the method of FIG. 1 in accordance with aspects of the present disclosure.

In FIG. 3(a), a basic approach, key information needed for optimization is made available from ships' metadata, third-party provided information and/or manually entered event data. Ships' hull performance information is available vis ship's metadata collected from ship designer or shipyard. Engine test and sea trial reports provide estimation of ship's base lines performance for different speed and draft conditions. Weather information may be obtained from third party sources, and is available for example at 3 hourly intervals via APIs. Voyage information may be collected manually via a voyage creation form which asks the user to enter voyage details such as start time of the voyage, end time of the voyage and the time window within which the vessel must reach the destination to fulfil its commercial contract.

Figure 3B:
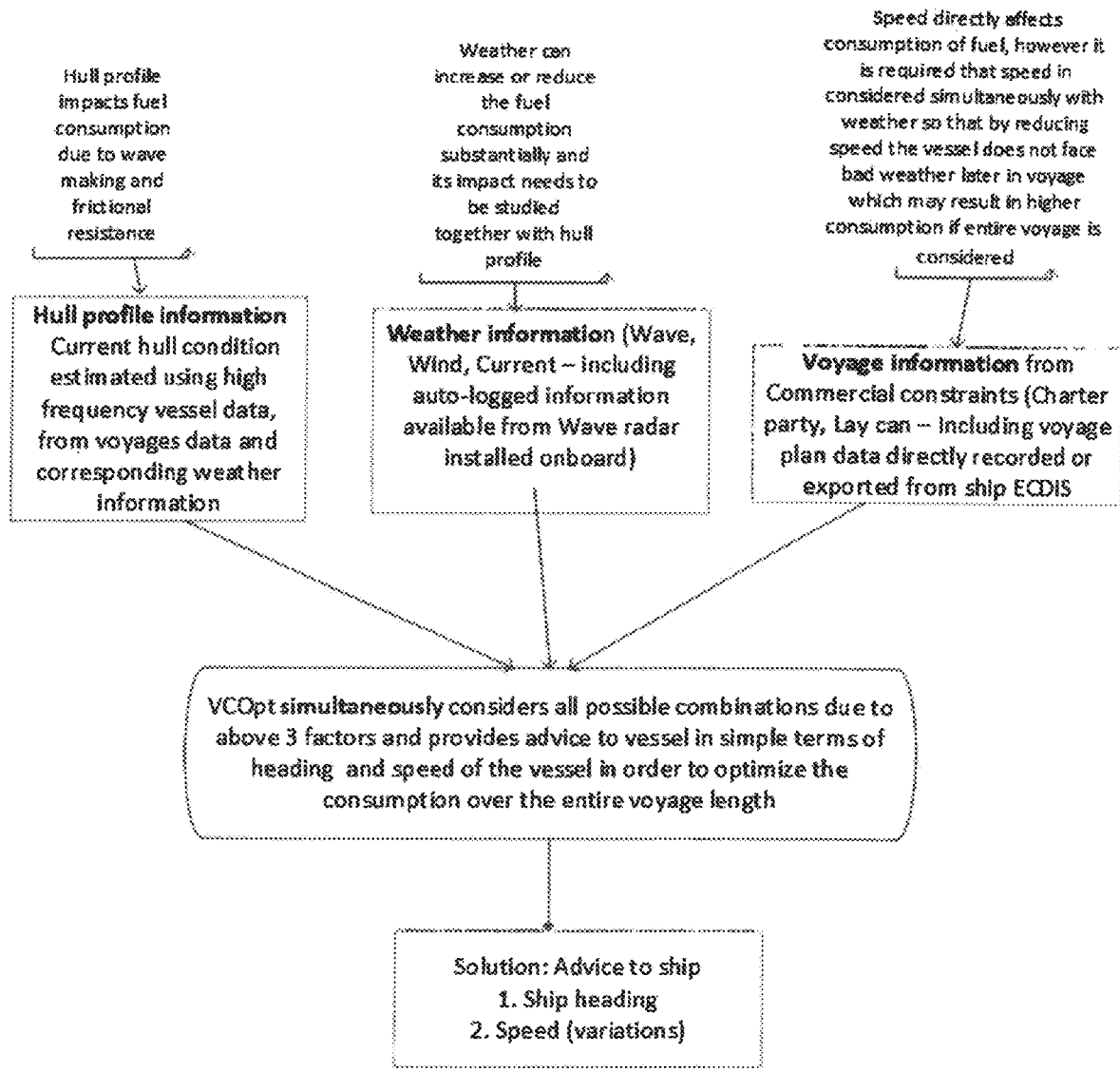
FIG. 3(b) presents a flow diagram further illustrating the method of FIG. 1 in accordance with aspects of the present disclosure.

In FIG. 3(b), a more advanced approach is presented, which not only cinsiders initial hull condition as collected from the metadata API 260, but further includes current hull conditions as can be determined, for example, from high-frequency (ultrasonic) testing. These conditions as determined may better reflect weather impact. In this case, weather data can be collected from shipboard sources and be more accurate as compared to estimated values provided by third partied. Preferably, voyage information is directly exported from ship equipment, thus reducing chances of error due to form based manual entry Returning to step 102 of FIG. 1, upon creating the voyage, it is preferably listed in the VCOPT app. The VCOPT app then gives the predicted route which is based on the details input by user from voyage plans. Before the vessel starts the journey for the selected voyage, it also prefereably recommends a route for achieving maximum cost savings as well as additional voyage route plans such as best economy, best weather, and/or fastest to reach the destination. Once the voyage is complete, the forecast route can be removed from reporting and the reported or the actual route taken by the vessel can appear along with associated data such as fuel used and distance travelled. It also provides the actual and predictive fuel consumption for the voyage. The routes may be shown on a world map, displayed together with fuel consumption graphs. This in turn allows user to understand and analyze the fuel savings they can achieve by taking the routes recommended by the VCOPT service 204. In creating a voyage, the user may for example enter following details:
1. Start Port Name
2. Start Port Latitude
3. Start Port Longitude
4. Destination Port Name
5. Destination Port Latitude
6. Destination Port Longitude
7. Displacement (in MT)
8. Actual Time Departure
9. Earliest Estimated Time of Arrival
10. Just in Time Estimated Time of Arrival
11. Fuel Density
12. Charter Party Fuel Consumption (in MT)
13. Charter Party Speed (in knots)

Preferably, the VCOPT service 204 allows the user to view the map plotted with predicted, forecasted and reported routes for the corresponding voyage. On hovering over a point in the required route type, the following details may preferably appear in a card format: day, date, latitiude, longitude, distance traveled and Beaufort wind force scale The VCOPT service 204 may also allow the user to view the following fuel consumption information:
  Predicted—This is the initial total fuel consumption prediction along with detailed voyage path, schedule and speed at the start of the voyage. It is calculated considering the optimum sailing path, weather forecasts, vessel displacement, vessel type and other vessel design data.
  Reported—This is the total fuel consumed by the main engine in tonnes as reported from the vessel either by Captain's Noon Report or Voyage Report.
  Forecast—This is the optimized forecast fuel prediction from the current location to the end of the Voyage. This line is can be removed once the voyage gets completed.
  Best Case—This is the calculated optimized total fuel consumption between the last two reported locations considering the optimized sailing path, actual weather along the way points, and other vessel parameters such as displacement, vessel type, possible speeds and so on.
  Worst Case—This is the total fuel consumption based on captain's reported weather data. Here, instead of considering the actual weather along the sailing path, VCOpt uses the captain's reported weather data and shows the worst possible fuel consumption for the voyage The forecasted route can be based on the following:
  Best Weather—Advice to reach the destination avoiding bad weather conditions.
  Best Economy—Advice to reach the destination by making the maximum savings.

Available routes may include the following:
  Most Fuel Efficient 1 and 2—Provides the top two detailed voyage plans which includes speed, weather, bearing and waypoints from the current location to the end of the voyage having the lowest total fuel consumption.
  Best Weather 1 and 2—Provides the top two detailed voyage plans which includes speed, weather, bearing and waypoints from the current location to the end of the voyage considering the best weather along the way.
  Hybrid 1 and 2—Provides two detailed voyage plans including speed, weather, bearing and waypoints from the current location to the end of the voyage while optimized between the lowest fuel consumption and the best weather. In most circumstances where the weather is not too adverse along the route matches the best fuel efficient plan.
  Fastest—Provide the detailed Voyage plan including speed, weather, bearing and waypoints from the current location to the end of the voyage to reach the destination at the shortest possible time Variances may be calculated and reported as follows:
  Variance from Optimal—Displays the savings in dollars which user may lose if vessel do not follow the route suggested by VCOpt. This is for the entire voyage
  Total Fuel Variance—Displays the fuel savings in metric tonne which user may lose if vessel do not follow the route suggested by VCOpt. This is for the entire voyage
  Total CO2 Variance—Displays the carbon emission savings which user may lose if vessel do not follow the route suggested by VCOpt. This is for the entire voyage.

Day by day variance can also be viewed for past and active voyage.

Figure 4:
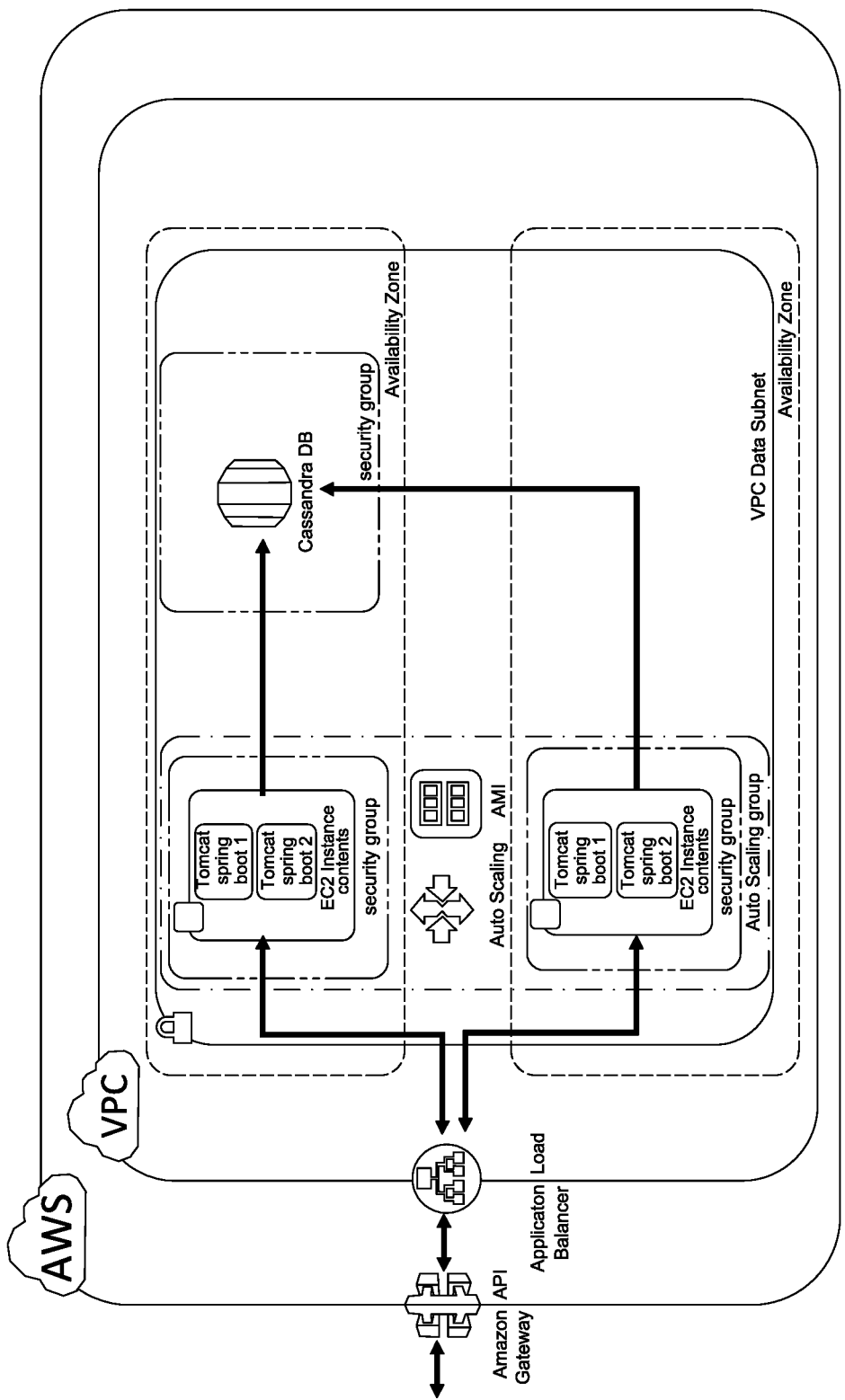
FIG. 4 provides a schematic diagram further illustrating the system of FIG. 2 in accordance with aspects of the present disclosure.
Figure 5:
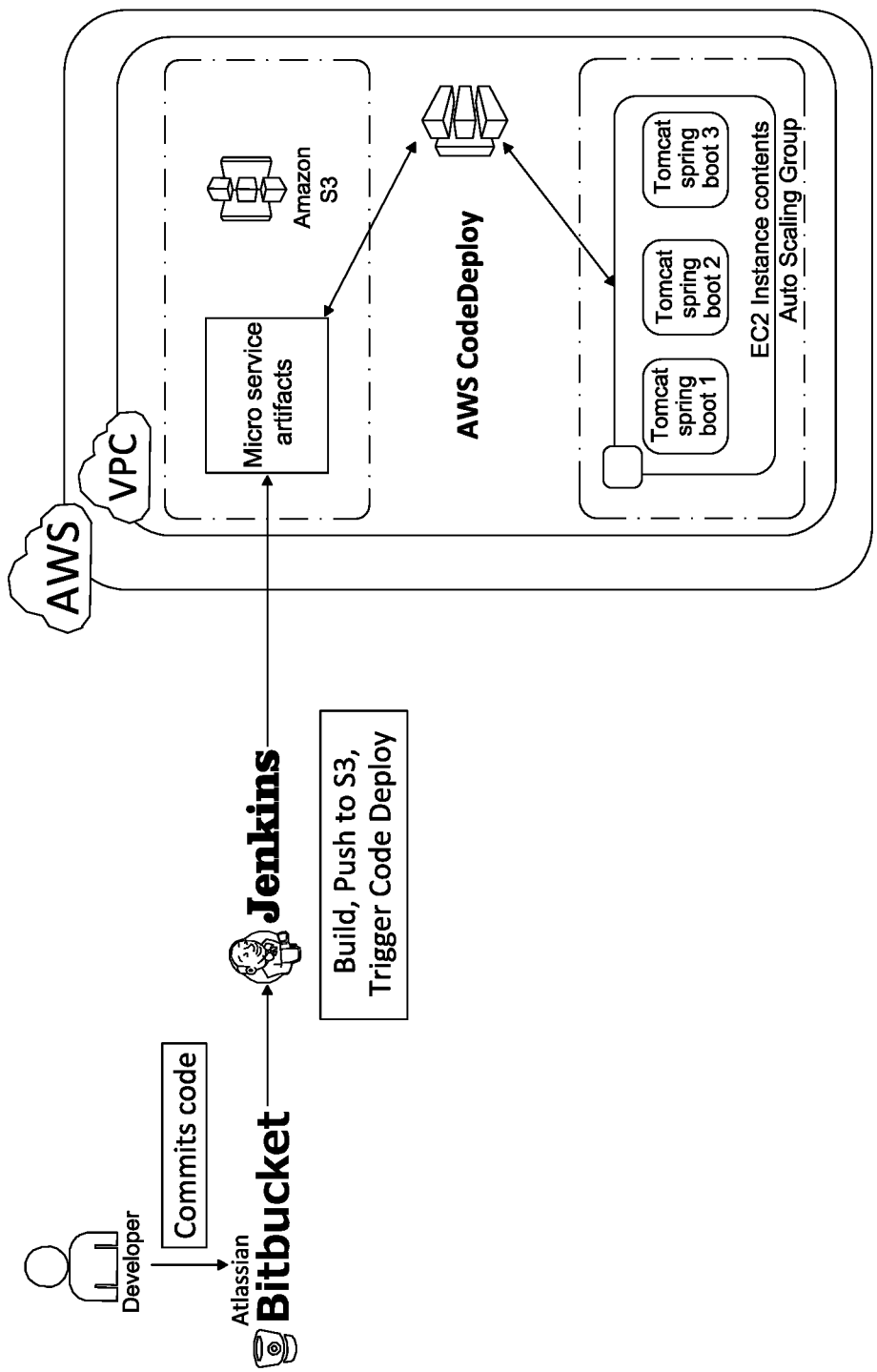
FIG. 5 provides a schematic diagram further illustrating the system of FIG. 2 in accordance with aspects of the present disclosure.

As previously described, VCOPT service 204 may be implemented on the AMAZON WEB SERVICE (AWS) platform. FIGS. 4 and 5 provide schematic diagrams illustrating the AWS platform and related tools used to build the service. FIG. 4 illustrates the basic system architecture, including the AMAZON VIRTUAL PRIVATE CLOUD (VPC) which enables the service to be administered securely in a virtual private network (VPN). Components used to configure VCOPT service 204 may for example include:
  JAVA 1.8;
  CASSANDRA 3.11.0 (http://cassandra.apache.org/;
  SPRING BOOT 1.5.4 (https://spring.io/);
  SWAGGER (https://swagger.io/) for documentation and API testing;
  JOLOKIA metrics and RYANTENNEY metrics (https://medium.com/@brunosimioni/near-real-time-monitoring-charts-with-spring-boot-actuator-jolokia-and-grafana-1ce267c50bcc, http://metrics.ryantenney.com/); and
  AWS IAM Authentication (overall API gateway authentication, https://aws.amazon.com/iam/).

FIG. 5 illustrates tools used in support of a continuous integration and continuous deployment (CI/CD) development process for VCOPT service 204 and BIGDATA service 206, including BITBUCKET (https://bitbucket.org/) as a source code hosting service, JENKINS (https://jenkins.io/) as an automation server, and AWS CODEDEPLOY (https://aws.amazon.com/codedeploy/) as a deployment service.

It will be understood that, while various aspects of the present disclosure have been illustrated and described by way of example, the invention claimed herein is not limited thereto, but may be otherwise variously embodied within the scope of the following claims.

We claim:
1. A computer-based method for optimizing a voyage plan for a vessel along a shipping route, comprising the steps of:

a. identifying each of a start point, a destination and an acceptable destination arrival period for the voyage plan;
b. querying a database to identify a plurality of historically-used shipping routes as candidates for selection for the voyage plan;
c. acquiring vessel-specific data for determining fuel oil consumption as a function of vessel conditions, vessel speed and weather conditions;
d. obtaining weather data that forecasts position and timing of adverse weather conditions along the plurality of candidate shipping routes;
e. calculating recommended ship headings and speeds along each of a plurality of segments for each of the plurality of candidate shipping routes, wherein the speeds are calculated to minimize fuel oil consumption along each candidate route subject to speed increases or decreases necessary to avoid routing through adverse weather conditions and subject to subject to the acceptable destination arrival period;
f. identifying as least one of the plurality of candidate shipping routes as providing best fuel efficiency and another one of the plurality of candidate shipping routes as providing best weather conditions;
g. selecting either the shipping route providing best fuel efficiency or the shipping route providing best weather for the voyage plan as an original route;
h. transmitting information about the selected route to a computer device of the vessel, including data describing the calculated heading and speed for each segment of the original shipping route;
i. acquiring data from the vessel reporting an actual shipping route taken by the vessel during execution of the voyage plan, wherein the actual shipping route data identifies a current location of the vessel not along a segment of the original shipping route;
j. selecting a new shipping route with the current location as the start point;
k. calculating recommended ship headings and speeds along each of a plurality of segments of the new shipping route and transmitting information about the new shipping route including recommended ship headings and speeds to the computer device of the vessel, wherein the ship headings speeds are calculated to minimize fuel oil consumption along the new shipping route subject to speed increases or decreases necessary to avoid routing through adverse weather conditions and subject to subject to the acceptable destination arrival period and optimized to provide either best fuel efficiency or best weather consistent with the selection of the original shipping route; and
l. transmitting data for display by a display of the computer device of the vessel, the data for displaying the original shipping route, the actual shipping route from the start point to the current location, and the new shipping route from the current location to the destination.

2. The method of claim 1, wherein the vessel-specific data comprises hull profile design information.

3. The method of claim 1, wherein the data acquired from the vessel comprises hull profile information indicative of present hull conditions and weather data.

4. The method of claim 1, wherein the weather data comprises at least one of wave, wind and current information.

5. The method of claim 4, wherein the weather data is obtained both from a weather data source provided by the vessel and from a third-party data source, wherein the data provided by the third-party data source is associated with a global positioning system (GPS) location of the vessel.

6. The method of claim 1, wherein adverse weather conditions are defined in accordance with a Beaufort scale.

7. The method of claim 1, wherein the information about the selected shipping route further includes waypoints for the voyage as a function of predicted durations of segments of the selected shipping route.

8. The method of claim 1, wherein the plurality of candidate shipping routes are determined as a function of frequency of use in other voyage plans.

9. A computer-based method for optimizing a voyage plan for a vessel along a shipping route, comprising the steps of:
a. identifying each of a start point, a destination and an acceptable destination arrival period for the voyage plan;
b. querying a database to identify a plurality of historically-used shipping routes as candidates for selection for the voyage plan;
c. acquiring vessel-specific design data for determining fuel oil consumption as a function of vessel conditions, vessel speed and weather conditions;
d. obtaining weather data that forecasts position and timing of adverse weather conditions along the plurality one or more of the candidate routes;
e. calculating recommended ship headings and speeds along each of a plurality of segments for each of the plurality of candidate shipping routes, wherein the speeds are calculated to minimize voyage duration along each candidate route subject to speed increases or decreases necessary to avoid routing through adverse weather conditions and subject to the acceptable destination arrival period;
f. identifying as least one of the plurality of candidate shipping routes as providing shortest duration and another one of the plurality of candidate shipping routes as providing best weather conditions;
g. selecting either the shipping route providing shortest duration or the shipping route providing best weather for the voyage plan as an original route;
h. transmitting information about the selected route to a computer device of the vessel, including data describing the calculated heading and speed for each segment of the original shipping route;
i. acquiring data from the vessel reporting an actual shipping route taken by the vessel during execution of the voyage plan, wherein the actual shipping route data identifies a current location of the vessel not along a segment of the original route;
j. a new optimal route with the current location as the start point;
j. calculating recommended ship headings and speeds along each of a plurality of segments of the new route;
k. transmitting information about the new shipping route including recommended ship headings and speeds to the computer device of the vessel, wherein the ship headings speeds are calculated to minimize voyage duration along the new shipping route subject to speed increases or decreases necessary to avoid routing through adverse weather conditions and subject to subject to the acceptable destination arrival period and optimized to provide either shortest duration or best weather consistent with the selection of the original shipping route; and
l. transmitting data for display by a display of the computer device of the vessel, the data for displaying the original shipping route, the actual shipping route from the start point to the current location, and the new shipping route from the current location to the destination.

10. The method of claim 9, wherein the vessel-specific data comprises hull profile design information.

11. The method of claim 9, wherein the data acquired from the vessel comprises hull profile information indicative of present hull conditions and weather data.

12. The method of claim 9, wherein the weather data comprises at least one of wave, wind and current information.

13. The method of claim 12, wherein the weather data is obtained both from a weather data source provided by the vessel and from a third-party data source, wherein the data provided by the third-party data source is associated with a global positioning system (GPS) location of the vessel.

14. The method of claim 9, wherein adverse weather conditions are defined in accordance with a Beaufort scale.

15. The method of claim 9, wherein the information about the selected shipping route further includes waypoints for the voyage as a function of predicted durations of segments of the selected shipping route.

16. The method of claim 9, wherein the plurality of candidate shipping routes are determined as a function of frequency of use in other voyage plans.

* * * * *